US007502629B2

(12) United States Patent
Vanhatalo et al.

(10) Patent No.: US 7,502,629 B2
(45) Date of Patent: Mar. 10, 2009

(54) METHODS AND DEVICES FOR TRANSFERRING A SECRET TO ENABLE AUTHENTICATED WIRELESS COMMUNICATION

(75) Inventors: Aki Vanhatalo, Oulu (FI); Jari Kokkonen, Oulu (FI)

(73) Assignee: Nokia Corporation, Espoo (FI)

( * ) Notice: Subject to any disclaimer, the term of this patent is extended or adjusted under 35 U.S.C. 154(b) by 812 days.

(21) Appl. No.: 10/461,744

(22) Filed: Jun. 13, 2003

(65) Prior Publication Data

US 2004/0253983 A1 Dec. 16, 2004

(51) Int. Cl.
*H04B 1/38* (2006.01)
*H04M 1/00* (2006.01)
(52) U.S. Cl. .................... 455/558; 455/410; 455/418
(58) Field of Classification Search ............ 455/41.2, 455/558, 410, 418, 425
See application file for complete search history.

(56) References Cited

U.S. PATENT DOCUMENTS 5,537,474 A * 7/1996 Brown et al. ............. 380/248
6,456,859 B1 * 9/2002 Desblancs et al. .......... 455/558
6,493,553 B1 * 12/2002 Rollender .................. 455/558
2002/0085511 A1 * 7/2002 Koponen et al. ............ 370/315
2002/0186845 A1 * 12/2002 Dutta et al. ................ 380/247
2004/0043788 A1 * 3/2004 Mittal ....................... 455/558
2004/0172535 A1 * 9/2004 Jakobsson et al. .......... 713/168

* cited by examiner

*Primary Examiner*—Nay A Maung
*Assistant Examiner*—Tuan H Nguyen
(74) *Attorney, Agent, or Firm*—Harrington & Smith, PC

(57) ABSTRACT

A handheld electronic device comprising: a memory device and a processor. The memory device is temporarily removable from the handheld electronic device for connection with another device. The removable memory device includes a data base structure in which a secret is associated with a predetermined identifier, such that querying the database structure using the predetermined identifier returns the secret. The removable memory device also includes an interface that enables the handheld electronic device to amend and query the data base structure and enables the another device to query the database structure using the predetermined identifier to obtain the secret. The processor is for amending the database structure and for querying the data base structure, wherein querying the database structure using the predetermined identifier returns the secret.

32 Claims, 2 Drawing Sheets

METHODS AND DEVICES FOR TRANSFERRING A SECRET TO ENABLE AUTHENTICATED WIRELESS COMMUNICATION

TECHNICAL FIELD

Embodiments of the invention relate to the transfer of a secret to enable authenticated wireless communication, in particular low power radio frequency wireless communication.

BACKGROUND TO THE INVENTION

Bluetooth Specification v1.0B, Baseband Specification, describes in detail the security measures that are used in a Bluetooth transceiver device to ensure trusted low power radio frequency (LPRF) wireless communication.

The security measures include an authentication procedure and encryption.

The authentication procedure involves a challenge-response scheme in which it is verified that a claimant device shares a secret with a verifier device before the verifier device allows communication with the claimant device. The claimant's knowledge of the secret is checked using symmetric processes in both devices.

First, the verifier receives the claimant's Bluetooth address (BD_ADDR). The BD_ADDR is a 48 bit IEEE address which is unique for each device. The Bluetooth addresses are publicly known and can be obtained via the man machine interface (MMI) of the claimant or automatically, via an inquiry routine initiated by the verifier.

A random number RAND is generated in the verifier and transmitted from the verifier to the claimant.

In the verifier, the following inputs are provided to an algorithm: RAND (verifier), BD_ADDR (claimant), link key (shared). The RAND (verifier) is the random number generated in the verifier. The DB_ADDR (claimant) is the BD_ADDR of the claimant. The link key (shared) is a shared secret key. The algorithm produces an output SRES.

In the claimant a symmetric process occurs, the same inputs are provided to the same algorithm: RAND (verifier), BD_ADDR (claimant), link key (shared). The RAND (verifier) is the random number generated and sent by the verifier. The BD_ADDR (claimant) is the BD_ADDR of the claimant. The link key (shared) is a shared secret key. The algorithm E produces an output SRES.

The output SRES from the claimant is sent to the verifier. If it matches the SRES produced in the verifier, then the claimant and verifier share the same secret (link key) and the claimant is authenticated.

When two devices do not have a common link key a secret initialization key is created based on a secret PIN and a random number. A random number RAND is generated in the verifier and sent from the verifier to the claimant.

The verifier receives or has received the claimant's Bluetooth address (BD_ADDR). e.g. via an inquiry routine by initiated by the verifier.

A symmetric operation occurs in the verifier and the claimant. An algorithm receives as inputs: a PIN (shared), BD_ADDR (claimant), RAND (verifier) and produces as an output the initialization link key ($K_{init}$). The RAND (verifier) is the random number generated by the verifier. The BD_ADDR (claimant) is the BD_ADDR of the claimant. The PIN (shared) is a shared secret.

The PIN code can be a fixed number provided with the Bluetooth device or may be selected arbitrarily by the user, and then entered in both the verifier and claimant. Using an arbitrary PIN is more secure than using a fixed PIN.

The secure sharing of a PIN code is therefore important for security.

BRIEF SUMMARY OF THE INVENTION

According to one aspect of the present invention there is provided a handheld electronic device comprising: a memory device and a processor. The memory device is temporarily removable from the handheld electronic device for connection with another device. The removable memory device includes a data base structure in which a secret is associated with a predetermined identifier, such that querying the database structure using the predetermined identifier returns the secret. The removable memory device also includes an interface that enables the handheld electronic device to amend and query the data base structure and enables the another device to query the database structure using the predetermined identifier to obtain the secret. The processor is for amending the database structure and for querying the data base structure, wherein querying the database structure using the predetermined identifier returns the secret.

According to another aspect of the invention there is provided an electronic device comprising: an interface and a processor. The interface is for connection with a memory device, that is temporarily removable from a handheld electronic device for connection with the electronic device. The memory device includes a data base structure in which a secret is associated with a predetermined identifier, such that querying the database structure using the predetermined identifier returns the secret. The processor is for querying the data base structure using the predetermined identifier to obtain the secret.

According to another aspect of the invention there is provided a method of transferring a secret from a first device to a second device using a memory device, that is temporarily removable from the first device for connection with the second device. The memory device includes a data base structure in which a secret is associated with a predetermined identifier, such that querying the database structure using the predetermined identifier returns the secret. The method comprises the steps of: transferring the memory device from the first device to the second device; and, in the second device, automatically querying the transferred memory device with the predetermined identifier to obtain the secret from the memory device.

Embodiments of the invention may therefore reduce the burden on a user. The user no longer has to remember a secret PIN. There is no need to enter a secret PIN, instead the removable memory device is transferred from one device to another.

Embodiments of the invention find particular application when the another device does not have a user interface and user input of the secret PIN is not possible.

The term "identifier" may be the memory address of the secret in the data base structure or, for example, a textual identifier such as the example "BT_PIN".

BRIEF DESCRIPTION OF THE DRAWINGS

For a better understanding of the present invention and to better understand how the same may be brought into effect, reference will now be made by way of example only to the accompanying drawings in which.

DETAILED DESCRIPTION OF EMBODIMENT(S) OF THE INVENTION

Figure 1:
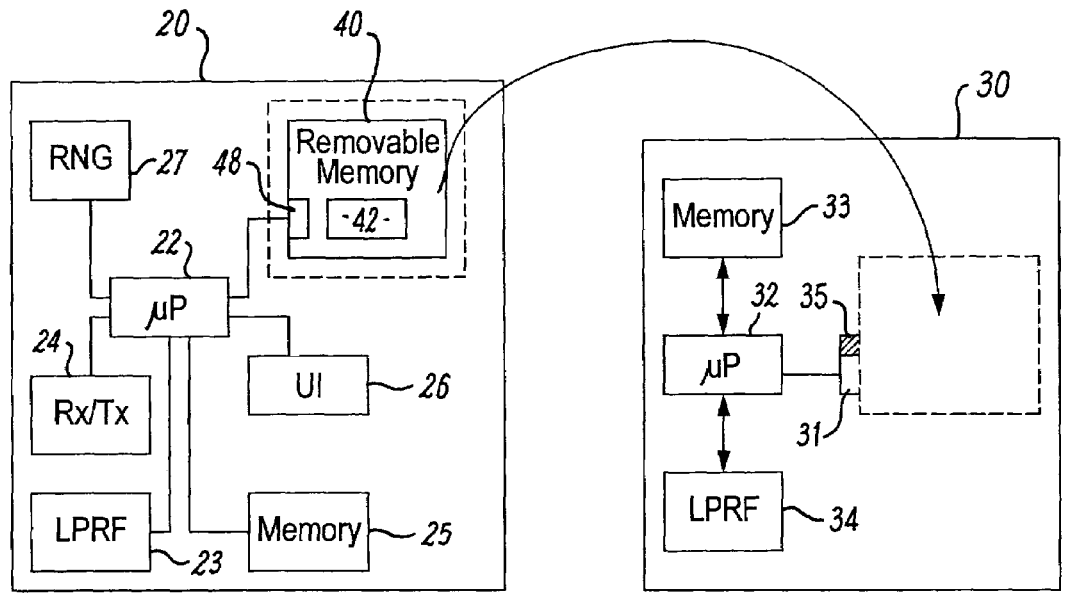
FIG. 1 illustrates a back-up system for a handheld electronic device.

FIG. 1 illustrates a back-up system 10 for a handheld electronic device 20. The handheld electronic device uses Bluetooth low power radio communication with a back-up device 30 to transfer information from the handheld electronic device to a memory 33 in the back-up device 30.

The system 10 includes a handheld electronic device, such as a Bluetooth enabled mobile cellular telephone 20, and a Bluetooth enabled back-up device 30. Information must be transferred from the mobile telephone to the back-up device 30 using Bluetooth in order to back the information up. However, the transfer cannot occur until the mobile telephone 20 and the back-up device 30 have authenticated in the Bluetooth wireless domain. Authentication ensures that the wireless communication is between the correct devices.

As described above, authentication requires that the devices share a secret PIN that is used to produce a secret key. The back-up device 30 may not have a user input device for entering a secret PIN, so the secret PIN must be provided to the back-up device 30 in an alternative, yet secure way. In embodiments of the invention, a removable memory device 40 is used to physically transport the secret PIN from the mobile telephone 20 to the back-up device 30.

The mobile cellular telephone 20 includes: a removable portable memory 40 connected to a processor 22; a low power radio frequency (LPRF) transceiver 23, for communicating in a Bluetooth ad-hoc network, connected to the processor 22; a cellular radio transceiver 24, for communicating in a cellular telephone network, connected to processor 22; a memory 25 connected to processor 22; a user interface 26 connected to processor 22; and a random number generator 27 connected to processor 22.

The removable memory 40 may any suitable portable memory that can be temporarily removed from the mobile telephone 20 and connected to the back-up device 30. It may be for example a smart card that is used for authentication of the mobile telephone 20 in the cellular telephone network or another type of removable memory device such as a memory stick.

The removable memory device 40 includes a data base structure 42. The data base structure is used for two purposes. It has a primary purpose of storing contact information but it is additionally re-used to store the secret PIN.

Figure 2:
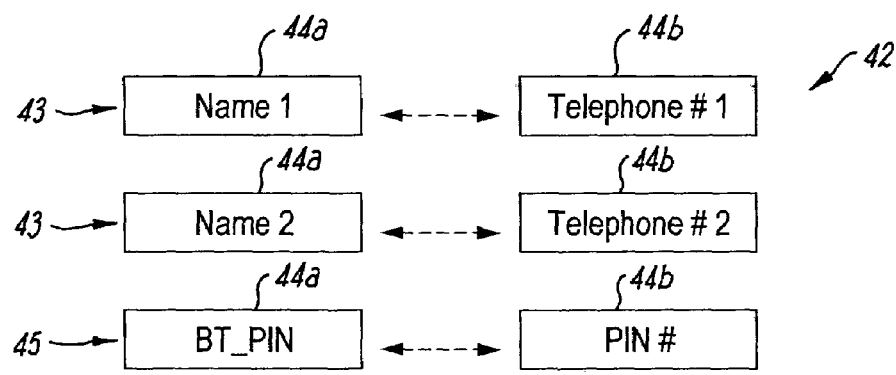
FIG. 2 schematically illustrates the data base structure.

The data base structure 42 is illustrated in FIG. 2. The database structure 42 includes a plurality of entries 43, each of which is for different contact information. Each entry 43 includes a first field 44a for storing an identifier such as a contact name and at least a second associated field 44b for storing contact information, such as a telephone number. The database structure includes an adapted entry 45 that instead of contact information has security information. The adapted entry 45 is the same as other entries in the data base structure 42, except for the content of the first field 44a and second field 44b. A predetermined identifier, e.g. "BT_PIN" is in the first field 44a and the secret PIN number e.g. "147903673785" is in the associated second field 44b.

Querying the data base structure using the value of a first field 44a returns the value of the associated second field. For example, querying "Name 1" returns telephone number 1 e.g. +1234567890 and querying using the predetermined identifier "BT_PIN" returns the secret PIN number e.g. "147903673785".

The removable memory 40 has an interface 48 that is used to connect the removable memory 40 to the processor 22 of the mobile telephone 20. The same or a different interface 48 is used to connect the removable memory 40 to the back-up device 30.

The processor 22 is able to amend at least some of the entries 43 of the data base structure 22. For example, a user can instruct the processor 22 using the user interface 26 to add a new entry or to change the information stored for an existing entry. The processor 22 enables the user to enter data for the first field, then enter information for the second field and then to confirm the entry before the data base structure 42 is updated by the processor 22.

The processor 22 is also operable to query the data base structure 42 using the value of a first field to obtain the value of its associated second field. This enables the processor to query the database structure using the predetermined identifier "BT_PIN" to obtain the secret PIN and store it in memory 25 for use in the authentication process.

The back-up device 30 has an interface 31 for connection with the interface 48 of the memory device 40, a processor 32, a memory 33, a low power radio transceiver 34, and a detector 35. The detector 35 may be a part of the interface 31. The processor 32 is connected to each of the interface 31, memory 33 and LPRF transceiver 34. In this example, the back-up device 30 dos not have a user input mechanism that would allow a user to enter a secret PIN directly into the back-up device 30.

The LPRF transceiver 34 is capable of communicating with the low power radio frequency transceiver 23 of the mobile telephone 20.

The memory 33 stores the predetermined identifier e.g. "BT_PIN".

The detector 35 detects when the memory device 40 has been connected to the back-up device 30. It may for example be a physical switch that is activated by the physical connection between the portable memory device 40 and the back-up device 30 or it may detect a change in electrical impedance at the interface 31 when electrical contact is made between that interface 31 and the interface 48 of the portable memory device 40.

The processor 32 is arranged to automatically read the memory 33 when the detector 35 detects the connection of the portable memory device 40 and back-up device 30 to obtain the predetermined identifier "BT_PIN". The processor 34 then automatically queries the data base structure 42 in the connected portable memory device 40 using the predetermined identifier "BT_PIN". The data base structure 42 returns the value of the second field associated with the first field having the value "BT_PIN". The returned value is the secret PIN.

The back-up device 30 may be arranged to permanently store the value of the secret PIN in association with an identifier of the mobile telephone (e.g. the mobile telephone BD_ADDR) in memory 33. This may allow authentication between the mobile telephone 20 and the back-up device 30 at a later time without having to transfer the PIN from the mobile telephone 20 via the removable portable memory device 40.

Figure 3:
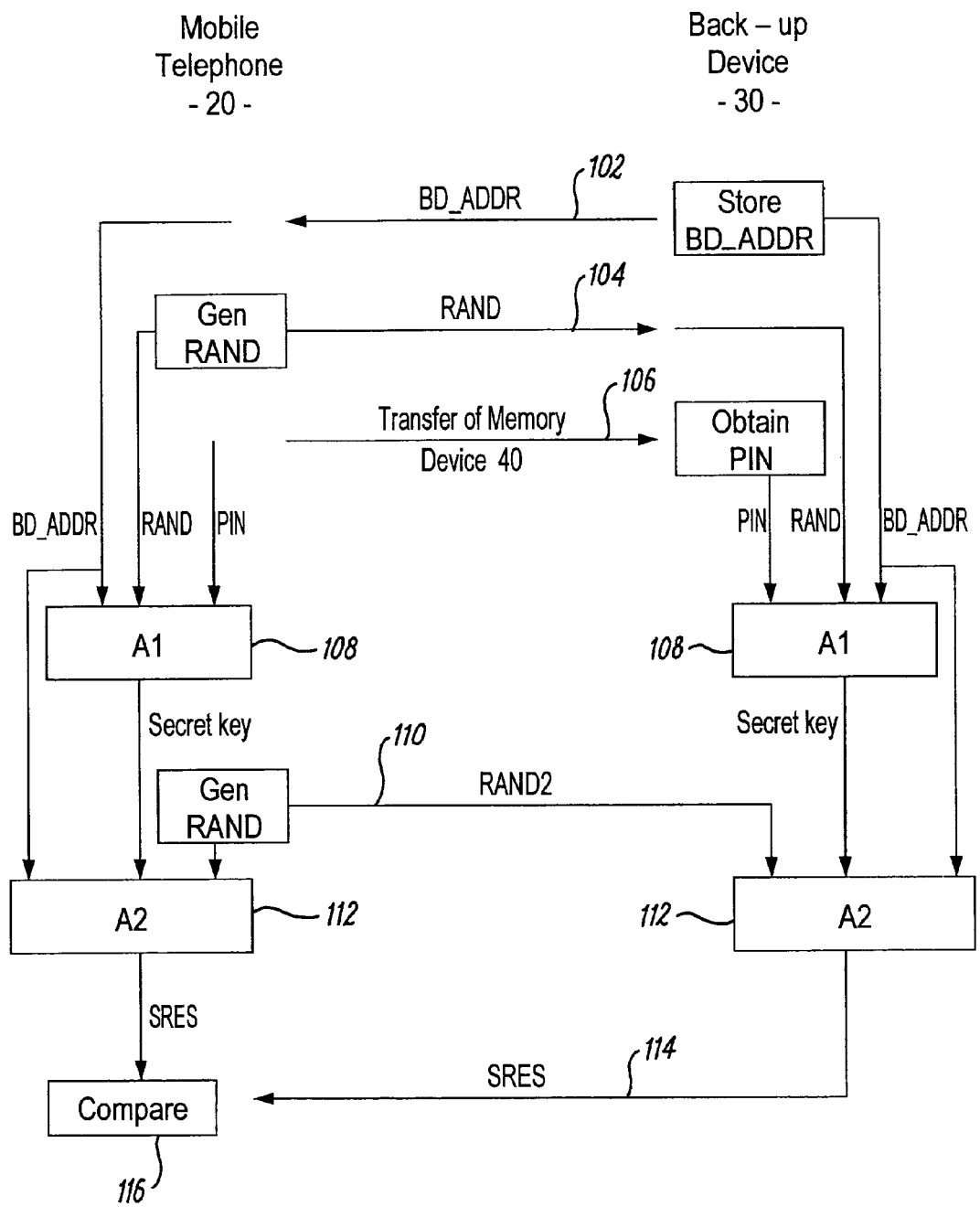
FIG. 3 illustrates an authentication procedure according to one embodiment of the invention.

The authentication procedure will now be described with reference to FIG. 3.

The BD_ADDR of the back-up device 30 is shared between the mobile telephone 20 and the back-up device 30 using an inquiry procedure at step 102. The mobile telephone 20 operates as a Master and initiates an inquiry procedure. The back-up device 30 responds with its BD_ADDR.

At step 104, a random number RAND is shared by generating it in the random number generator 27 of the mobile telephone 20 and sending it via the LPRF transceiver 23 to the LPRF transceiver 34 of the back-up device 30.

At step 106, the secret PIN is shared via physical transfer of the portable memory device 40. When the portable memory device 40 is connected to the back-up device 30, the back-up device automatically queries the data base structure 42 in the portable memory device 40 to obtain the secret PIN.

Then at step 108, the shared secret key is created in each of the mobile telephone 20 and the back-up device 30 using a shared algorithm A1 and the shared secret PIN, the shared BD_ADDR of the back-up device 30 and the shared random number. Thus the secret key for authentication is shared between the mobile telephone 20 and the back-up device 30 by using a shared secret PIN, the shared BD_ADDR, and a shared random number.

The authentication procedure is based upon a challenge-response mechanism. In this example, the mobile telephone 20 issues the challenge via its LPRF transceiver 23 and the back-up device 30 issues a response using its LPRF transceiver 34. The mobile telephone 20 compares the response received from the back-up device with an internally generated response and if there are the same, the back-up device 30 is authenticated. The back-up device 30 may then issue a challenge to the mobile telephone to authenticate it.

The response is created using the shared secret key, the shared public BD_ADDR, and a shared random number.

The challenge is issued, at step 110, by generating a random number RAND2 in the mobile telephone and sending it to the back-up device 30 using the LPRF transceiver 23. This step may be omitted if the random number RAND sent in step 104 is re-used.

The back-up device 30 creates, at step 112, a signed response (SRES) using an algorithm A2 that produces the SRES from the random number RAND2, the BD_ADDR and the secret key. This SRES is communicated, at step 114, to the mobile telephone 20 using the LPRF transceiver 34.

The mobile telephone 20 creates, at step 112, a signed response (SRES) from the random number RAND2, the BD_ADDR and the secret key. This locally produced SRES is compared, at step 116, with the received SRES and if they are the same the devices are authenticated.

Once the necessary security procedures are completed, the content of memory 25 of the mobile telephone 20 may be backed-up by copying its contents to the memory 33 of the back-up device 30. The content of the portable memory 40 may also be backed up. It may therefore be possible to at least partially synchronize the mobile telephone 20 and the back-up device 30 quickly via a fast direct connection electrical interface rather than through a wireless interface.

The mobile telephone 20 may be operable to amend the adapted entry 45 to change the secret PIN number in the second field 44b. The processor 22 may be operable to request the user to enter a new PIN number with each authentication. The newly entered PIN number is stored in the second field of the adapted entry 45 of the data base structure, from where it can be transferred to another device by the physical transfer of the removable portable memory device 40.

The back-up device 30 may have additional functionality. For example, it may additionally provide a charging function for the mobile telephone.

Although embodiments of the present invention have been described in the preceding paragraphs with reference to various examples, it should be appreciated that modifications to the examples given can be made without departing from the spirit and scope of the invention as claimed. For example, although the invention has been described with reference to a back-up device 30, it can be used with an suitable electronic device such as a mobile phone. Such a device 30 may, but does not have to offer a back-up facility.

We claim:

1. An apparatus comprising:
a memory device configured to be temporarily removable from the apparatus to be connected with another device, wherein the memory device comprises a data base structure in which a secret is associated with a predetermined identifier, such that querying the database structure using the predetermined identifier returns the secret and an interface that is configured to enable the apparatus to amend and query the data base structure and to enable the another device to query the database structure using the predetermined identifier to obtain the said secret; and
a processor for amending the database structure and for querying the data base structure, wherein querying the database structure using the predetermined identifier returns the said secret,
wherein the apparatus is configured to perform an authentication procedure with the another device, based upon the said secret which was physically transported via the memory device between the apparatus and the another device.

2. An apparatus as claimed in claim 1, wherein the data base structure includes a plurality of entries, each of which includes a first field for storing an identifier and at least a second associated field for storing data.

3. An apparatus as claimed in claim 2, wherein the data base structure is for contact information, wherein the first field stores an identifier for the contact information and the second associated field stores the contact information.

4. An apparatus as claimed in claim 2, wherein the database structure includes an entry having the predetermined identifier in the first field and the secret in the associated second field.

5. An apparatus as claimed in claim 1, wherein the secret is a PIN.

6. An apparatus as claimed in claim 1, wherein the authentication procedure is based upon a challenge-response mechanism in which the response is dependent upon at least the secret and a random number.

7. An apparatus as claimed in claim 6, further comprising a low power radio frequency transceiver for communicating with a low power radio frequency transceiver of the another device.

8. An apparatus as claimed in claim 7, arranged to obtain a device address of the another device using an inquiry procedure, wherein the authentication procedure is based upon a challenge-response mechanism in which the response is dependent upon at least the secret, a random number and the device address of the another device.

9. An apparatus as claimed in claim 8, further comprising a random number generator wherein the random number used in the authentication procedure is generated in the random number generator and communicated to the another device using the low power radio transceiver.

10. An apparatus as claimed in claim 9, arranged to compare a response received from the another device via the low power radio frequency transceiver with a response produced in the apparatus to authenticate the another device for radio communication.

11. An apparatus as claimed in claim 1 wherein the memory device further comprises a detector for detecting when the memory device is connected to the another device.

12. An apparatus as claimed in claim 1 wherein the authentication procedure enables the establishment of a wireless communications link between the apparatus and the another device.

13. An apparatus as claimed in claim 12 wherein the wireless communications link is a low power radio frequency communications link.

14. An apparatus comprising:
   an interface for connection with a memory device, the memory device configured to be temporarily removable from a handheld electronic device for connection with the apparatus, wherein the memory device comprises a data base structure in which a secret is associated with a predetermined identifier, such that querying the database structure using the predetermined identifier returns the secret; and
   a processor configured to query the data base structure using the predetermined identifier to obtain the said secret,
wherein the apparatus is configured to perform an authentication procedure with the handheld electronic device based upon the said secret which was physically transported via the memory device between the apparatus and the handheld electronic device.

15. An apparatus as claimed in claim 14, further comprising a memory storing the predetermined identifier.

16. An apparatus as claimed in claim 14, wherein the secret is a PIN.

17. An apparatus as claimed in claim 14, wherein the authentication procedure is based upon a challenge-response mechanism in which the response created is dependent upon at least the secret and a random number.

18. An apparatus as claimed in claim 17, further comprising a low power radio frequency transceiver for communicating with a low power radio frequency transceiver of the handheld electronic device.

19. An apparatus as claimed in claim 18, arranged to provide its device address during an inquiry procedure, wherein the authentication procedure is based upon a challenge-response mechanism in which the response is dependent upon at least the secret, a random number and the device address.

20. An apparatus as claimed in claim 19, wherein the random number used in the authentication procedure is received from the handheld electronic device via the low power radio transceiver.

21. An apparatus as claimed in claim 20, wherein the low power radio frequency transceiver sends the response created during the authentication procedure to the handheld electronic device.

22. An apparatus as claimed in claim 14, without a user input mechanism.

23. An apparatus as claimed in claim 14, further comprising a detector for detecting the connection of the memory device at the interface.

24. An apparatus as claimed in claim 23, wherein the processor in response to the detection of the connection of the memory device at the interface by the detector, automatically queries the database with the predetermined identifier.

25. An apparatus as claimed in claim 14 wherein the memory device further comprises a detector for detecting when the memory device is connected to the handheld electronic device.

26. An apparatus as claimed in claim 14 wherein the authentication procedure enables the establishment of a wireless communications link between the apparatus and the handheld electronic-device.

27. An apparatus as claimed in claim 26 wherein the wireless communications link is a low power radio frequency communications link.

28. A method of transferring a secret from a first device to a second device using a memory device, the memory device configured to be temporarily removable from the first device to be connected with the second device, wherein the memory device comprises a data base structure in which a secret is associated with a predetermined identifier, such that querying the database structure using the predetermined identifier returns the said secret, the method comprising:
   transferring the memory device from the first device to the second device;
   in the second device, automatically querying the transferred memory device with the predetermined identifier to obtain the said secret from the memory device, and
   performing an authentication procedure between the first and second devices based upon the said secret which was physically transported via the memory device between the first device and the second device.

29. A method as claimed in claim 28 wherein the memory device further comprises a detector for detecting when the memory device is connected to the second device.

30. A method as claimed in claim 28 wherein the authentication procedure enables the establishment of a wireless communications link between the first device and the second device.

31. A method as claimed in claim 30 wherein the wireless communications link is a low power radio frequency communications link.

32. An apparatus comprising:
   removable memory means, that is temporarily removable from the apparatus to be connected with another device, wherein the removable memory means is for storing a data base structure in which a secret is associated with a predetermined identifier, such that querying the database structure using the predetermined identifier returns the secret and the removable memory means further comprises interface means for enabling the apparatus to amend and query the data base structure and for enabling the another device to query the database structure using the predetermined identifier to obtain the said secret; and
   processing means for amending the database structure and for querying the data base structure, wherein querying the database structure using the predetermined identifier returns the said secret,
wherein the apparatus is arranged to perform an authentication procedure with the another device, based upon the said secret which was physically transported via the removable memory means between the apparatus and the another device.

* * * * *